US005095795A

United States Patent [19]

[11] Patent Number: 5,095,795

Wilfer

[45] Date of Patent: Mar. 17, 1992

[54] STRING INSTRUMENT, PARTICULARLY BASS GUITAR OR ELECTRIC GUITAR

[76] Inventor: Hans-Peter Wilfer, Fährstr. 5, D-8557 Eggolsheim, Fed. Rep. of Germany

[21] Appl. No.: 530,887

[22] Filed: May 30, 1990

[30] Foreign Application Priority Data

Mar. 21, 1990 [DE] Fed. Rep. of Germany ....... 4009001

[51] Int. Cl.[5] .............................................. G03B 3/00

[52] U.S. Cl. .............................................. 84/291

[58] Field of Search .......................... 84/290, 291, 292

[56] References Cited

U.S. PATENT DOCUMENTS 1,336,409 4/1920 Ashley .
3,781,451 12/1972 Nolan .
4,351,217 9/1982 Wechter .......................... 84/291 X
4,394,830 7/1983 Damiano .
4,697,491 10/1987 Maloney .

FOREIGN PATENT DOCUMENTS 3520843 12/1986 Fed. Rep. of Germany .
3803254 11/1989 Fed. Rep. of Germany .
2045993 3/1980 United Kingdom .
1134317 8/1987 United Kingdom .

*Primary Examiner*—Brian W. Brown
*Attorney, Agent, or Firm*—Toren, McGeady & Associates

[57] ABSTRACT

A string instrument, particularly a base guitar or an electric guitar, includes a body which defines a compartment for receiving the components of an electric sound pickup and an amplifying system. A cover is releasably mounted on the rear side of the body of the instrument for closing the compartment. A frame is fastened to the side wall of the compartment. The cover is constructed so as to fit on or into the frame. Locking members are provided between the frame and the cover for mounting the cover on the frame and for removing the cover from the frame.

14 Claims, 5 Drawing Sheets 1
9
10
12
13
14
15
17
IV
V
VI
VII
VIII

STRING INSTRUMENT, PARTICULARLY BASS GUITAR OR ELECTRIC GUITAR

BACKGROUND OF THE INVENTION

1. Field of the Invention

The present invention relates to a string instrument, particularly a bass guitar or an electric guitar. The guitar has in its body a compartment for receiving the components of an electric sound pickup and possibly an amplifier. The compartment is accessible through a cover which is releasably mounted on the rear side of the body of the guitar.

2. Description of the Related Art

In known string instruments of the above-described type, the compartment for receiving the electronic components is provided with a cover which is screwed to the body of the instrument by means of a large number of screws. Each time it is necessary to have access to the compartment for repairing or exchanging components in the compartment, it is necessary to unscrew the fastening screws of the cover and to screw the screws in again after the necessary work has been performed. These operations are cumbersome and time-consuming. They make it necessary to have available an appropriate screwdriver, usually a Phillips screwdriver. In addition, there is the danger that the screws are lost after they are removed or that they at least fall from the table.

SUMMARY OF THE INVENTION

It is, therefore, the primary object of the present invention to improve the above-described known string instruments with structurally simple means. Specifically, opening and closing of the compartment containing the electronic components is to be made simpler and quicker.

In accordance with the present invention, a frame is fastened to the side wall of the compartment. The cover is constructed so as to fit on or into the frame. Engagement means are provided between the frame and the cover for mounting the cover on the frame and for removing the cover from the frame.

The cover and the frame are preferably injection molded parts of plastics material which are inexpensive to manufacture. After the frame has been mounted on the compartment, the cover can be fastened to the frame by means of the engagement means with practically a single manipulation and can be just as easily removed from the frame. The disadvantages of the above-described known string instruments are avoided.

In accordance with a preferred feature of the invention, the frame is approximately L-shaped in cross-section. The L-shaped frame has a first, preferably shorter side which rests on the rear side of the body of the instrument and a second, preferably longer side which rests against the side wall of the compartment. This configuration of the frame ensures that the first side secures the desired vertical position relative to the body of the instrument and the second side secures the correct position of the frame relative to the edge of the compartment.

The frame may be fastened to the body of the instrument by clamping or gluing. Preferably, fastening of the frame is effected by means of screws by means of which one of the sides of the frame, preferably the second side resting against the side wall of the compartment, is screwed to the body of the instrument.

In accordance with another preferred feature of the invention, the engagement means is composed of at least one, preferably two, resiliently movable locking means mounted on the cover or frame and at least one recess in the frame or cover for receiving the locking means. The recess includes an abutment which, in the mounted position of the cover, is engaged by the corresponding locking means.

The locking means may be movable from the locking position into the unlocked position either manually, for example, by means of a fingernail, or also by applying a small tool to it.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
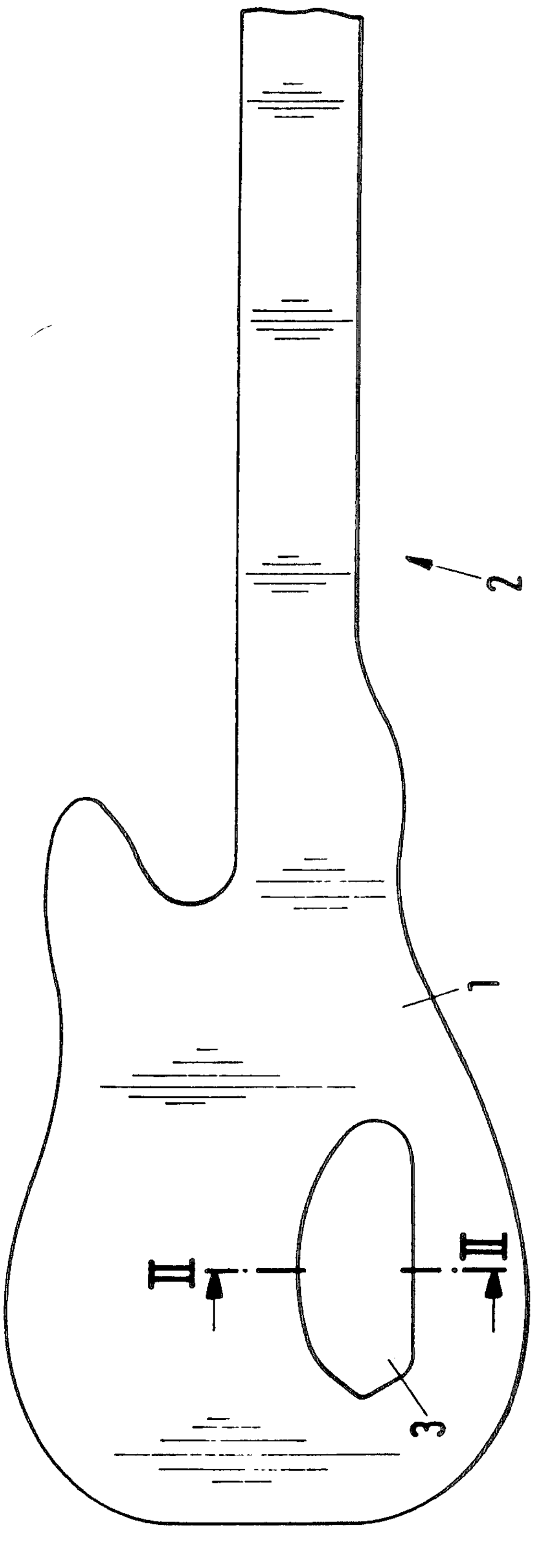
FIG. 1 is a bottom view of a guitar.
Figure 2:
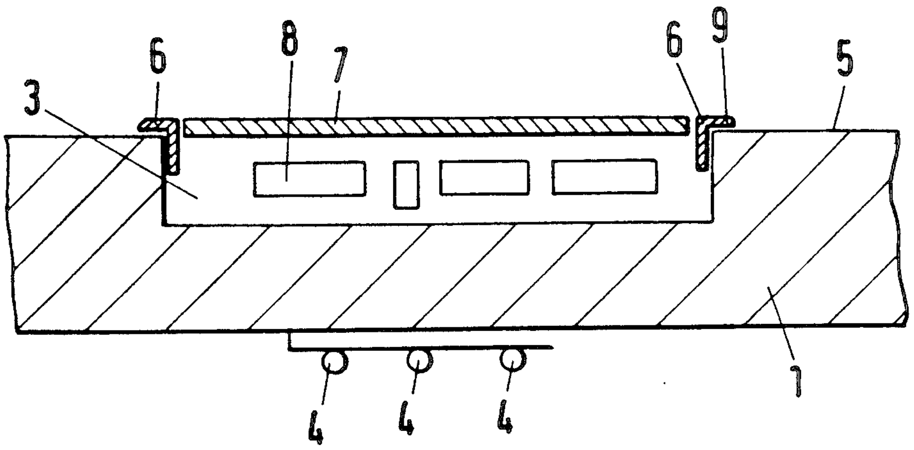
FIG. 2 is a sectional view, on a larger scale, along sectional line II—II in FIG. 1.

FIGS. 1 and 2 of the drawing show a body 1 of a string instrument, particularly a bass guitar 2. A compartment 3 is cut out of the body which preferably is of wood. The compartment 3 receives the electronic components 8 which pick up the sound vibrations of the strings 4 and which already reinforce these vibrations or conduct them to an amplifier system.

As shown in FIG. 2, the compartment 3 is open on the rear side 5 of the body which is opposite the side with the strings 4. The compartment 3 is surrounded at the edge of the compartment at the rear side 5 by a frame 6. A cover 7 can be releasably connected to the frame 6 by engagement means. In this connection, FIG. 2 schematically illustrates the cover 7 in the locked position in which it covers the electronic components 8.

The construction of the frame is illustrated in more detail in FIGS. 3–8. The frame 6 is L-shaped in cross-section with a first, preferably shorter side 9 which rests against the rear side 5 of the body and a second, preferably longer side 10 which rests against the side wall 11 of the compartment 3, as can also be seen in FIG. 2.

Figures 3, 4, 5, 6, 7, 8:
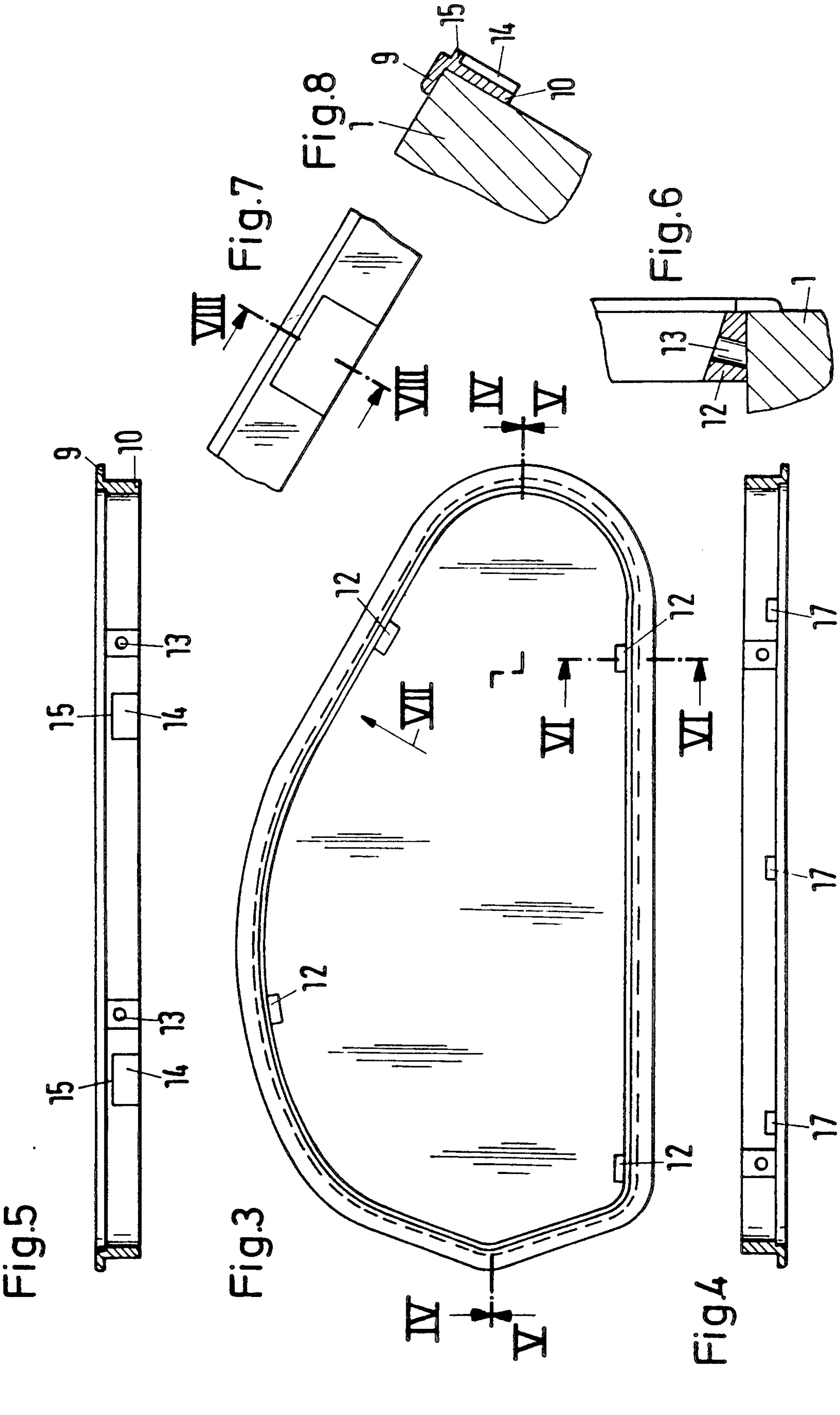
FIG. 3 is a top view of the frame, on a larger scale than FIG. 2.
FIG. 4 and FIG. 5 are side views corresponding to FIG. 3, taken along sectional lines IV—IV and V—V, respectively, in FIG. 3.
FIG. 6 is a sectional view, on a larger scale than FIG. 3, taken along sectional line VI—VI in FIG. 3.
FIG. 7 is a side view, also on a larger scale, in the direction of arrow VII in FIG. 3.
FIG. 8 is a sectional view taken along sectional line VIII—VIII in FIG. 7.

At several locations which are distributed over the circumference of the frame 6, the frame 6 has increased thickness portions 12 which are provided on the second side 10 and include bores 13 for passing a fastening screw therethrough, as shown in FIG. 6, so that the frame can be screwed at these locations to the wall 11 of the compartment 3. To illustrate this in more detail, FIG. 6 partially shows the instrument body 1. The same is true for FIG. 8.

The second, longer side 10 of the frame 6 has on the inside thereof recesses 14 which have abutments 15 at the upper sides. The recesses 14 are provided on the longitudinal side of the frame which is illustrated in FIG. 5 and, thus, corresponds to a sectional view or a section in accordance with arrows V—V in FIG. 3. The other longitudinal side of the frame which is shown in FIG. 4 and which corresponds to a sectional view or a side view in accordance with arrows IV—IV in FIG. 3 is provided with recesses or cutouts 17.

Figure 10:
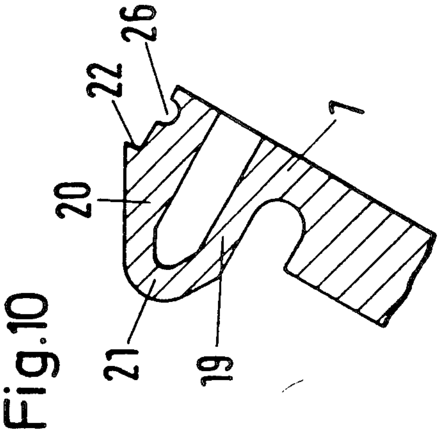
FIG. 10 is a sectional view, on a larger scale, taken along sectional line X—X in FIG. 9.
Figure 9:
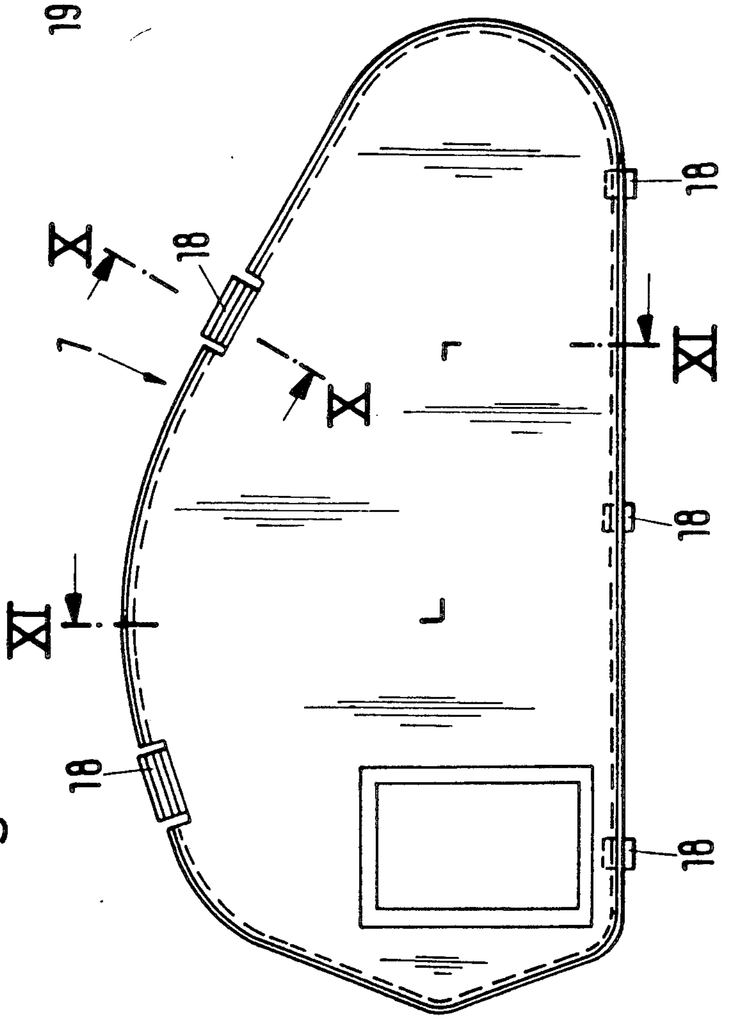
FIG. 9 is a top view, on the same scale as FIG. 3, showing another feature of the cover.
Figure 11:
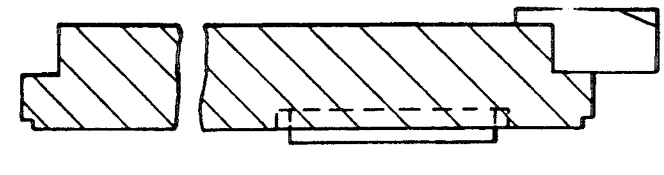
FIG. 11 is a sectional view, also on a larger scale, taken along sectional line XI—XI in FIG. 9.

FIG. 9 of the drawing is a top view of the cover 7 which on one longitudinal side thereof is provided with insertion pins 18 which fit into the above-mentioned recesses or cutouts 17 of the frame. In addition, the other longitudinal side of the cover 7 has resilient locking means 18. As shown in FIG. 10, the locking means 18 are V-shaped in cross-section. One side 19 of the V-shaped locking means 18 is provided on the cover 7 and the other side 20 is elastically bendable back and forth relative to the side 19 at a connection portion 21. The side 20 has a locking projection 22 which engages under the abutment 15 of the frame in the locked position, so that, in this position, the locking projection 22 is located in the recess 14 of the frame.

Figure 12:
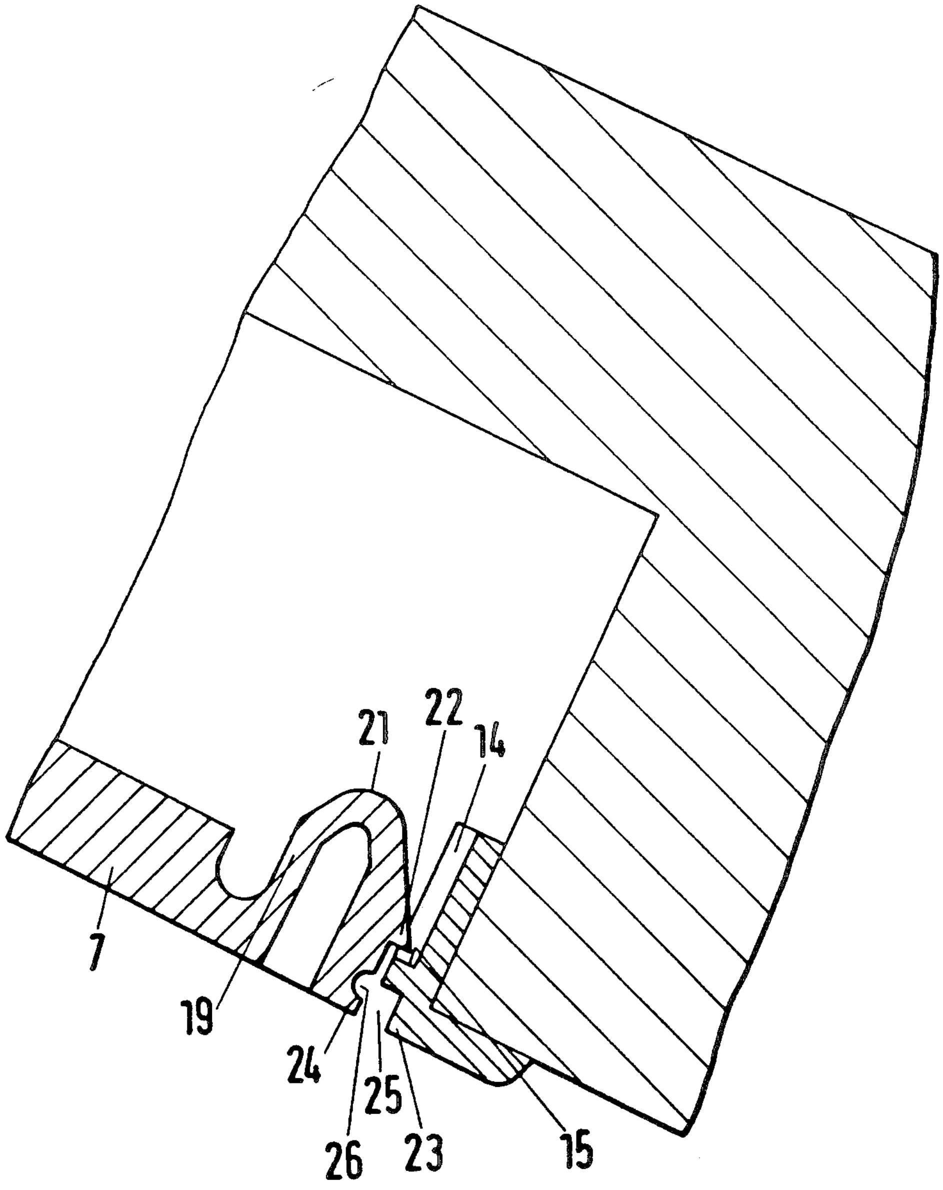
FIG. 12 is a partial view, also on a larger scale, of the compartment of the body of the guitar, the frame and the cover in the locked position of the cover.

The locked position referred to above and illustrated in detail in FIG. 12 can be obtained by initially inserting the insertion pins 18 of the cover into the cutouts 17 and subsequently pressing downwardly the other longitudinal side of the cover with locking means 18. When the other longitudinal side is pressed downwardly, initially the side 20 of the locking means 18 is bent about the portion 21 toward the side 19 until the edge 22 of this side 20 engages under the abutment 15. A gap 25 is provided between the upper portion 23 of the edge and the upper portion 24 of the side 20. The width of the gap 25 is such that a screwdriver or a fingernail can be inserted into the gap and the side 20 can be moved toward the side 19 for unlocking the cover. An approximately semicircular groove 26 is provided in the upper portion 24 of the side 20 for inserting a fingernail therein. The fingernail is inserted through the gap 25 and, thus, the side 20 can be pressed toward the side 19 and the cover can be pulled upwardly. The cover 7 can now be removed from the frame 6.

While a specific embodiment of the invention has been shown and described in detail to illustrate the application of the inventive principles, it will be understood that the invention may be embodied otherwise without departing from such principles.

I claim:

1. In a stringed instrument, particularly a bass guitar or an electric guitar, the instrument having a body, the body having a rear side, the body defining a compartment capable of receiving components of an electric sound pickup and an amplifying system, the compartment having a side wall, and a cover for the compartment, the cover being releasably mounted on the body of the instrument, the improvement comprising a frame fastened to the side wall of the compartment, the cover being constructed so as to fit on or into the frame, engagement means between the frame and the covers for mounting the cover on the frame and for removing the cover from the frame, the engagement means comprising at least one resiliently movable locking means mounted on the cover and at least one recess defined in the frame for receiving the locking means, the recess including an abutment, wherein, in a mounted position of the cover, the abutment is engaged by the locking means.

2. The string instrument according to claim 1, wherein the frame is approximately L-shaped in cross-section, the L-shaped frame having a first side in contact with the rear side of the body of the instrument and a second side in contact with the side wall of the compartment.

3. The string instrument according to claim 2, wherein the first side is the shorter side and the second side is the longer side of the L-shaped frame.

4. The string instrument according to claim 1, wherein one of the sides of the L-shaped frame is screwed to the body of the instrument.

5. The string instrument according to claim 4, wherein the side screwed to the body of the instrument is the second side in contact with the side wall of the compartment.

6. The string instrument according to claim 1, wherein the cover includes insertion pins and the frame has cutouts for receiving the insertion pins.

7. The string instrument according to claim 1, wherein the engagement means comprises at least one resiliently movable locking means mounted on the frame and at least one recess defined in the cover for receiving the locking means, the recess including an abutment, wherein, in a mounted position of the cover, the abutment is engaged by the locking means.

8. The string instrument according to claim 1, wherein the frame includes insertion pins and the frame defines cutouts for receiving the insertion pins.

9. The string instrument according to claims 1 or 7, wherein two resiliently movable locking means are provided.

10. The string instrument according to claims 1 or 7, wherein the frame and cover have first and second longitudinal sides, the locking means being provided on the first longitudinal side and the insertion pins and cutouts being provided at the second longitudinal side.

11. The string instrument according to claim 1, wherein the locking means is a V-shaped member having a first side fixed to the cover and a second side connected to and elastically movable relative to the first side, the movable side having a free end, the free end having a projection for engaging behind the abutment of the frame in the mounted position of the cover.

12. The string instrument according to claim 11, wherein the frame defines underneath the abutment an indentation for receiving the movable side of the locking means.

13. The string instrument according to claim 1, wherein a gap is defined between the frame and the movable side of the locking means when the cover is in the mounted position, the gap being at the rear side of the body, so that a small tool can be inserted in the gap.

14. The string instrument according to claim 4, wherein the screws for screwing the frame to the body extend at an acute angle relative to the rear side of the body.

* * * * *